United States Patent [19]
Martin et al.

[11] Patent Number: 5,947,152
[45] Date of Patent: *Sep. 7, 1999

[54] CHECK VALVE AND BACKFLOW PREVENTER

[75] Inventors: James F. Martin, West Greenwich; Leo W. Fleury, North Smithfield, both of R.I.; Gregory Fuchs, Framingham, Mass.

[73] Assignee: Grinnell Corporation, Cranston, R.I.

[*] Notice: This patent is subject to a terminal disclaimer.

[21] Appl. No.: 09/009,212

[22] Filed: Jan. 20, 1998

Related U.S. Application Data

[63] Continuation of application No. 08/692,944, Aug. 7, 1996, Pat. No. 5,709,240
[60] Provisional application No. 60/002,194, Aug. 11, 1995.

[51] Int. Cl.⁶ .................................................. F16K 15/00
[52] U.S. Cl. ........................... 137/527.2; 137/527.4; 137/512; 251/358; 251/363
[58] Field of Search .................... 251/363, 361, 251/362, 358; 137/527, 527.2, 527.4, 514, 316, 512

[56] References Cited

U.S. PATENT DOCUMENTS

| | | |
|---|---|---|
| 176,500 | 4/1876 | Woodward ............... 137/527.2 |
| 378,846 | 2/1888 | Murphy . |
| 463,175 | 11/1891 | John ............... 251/363 |
| 991,784 | 5/1911 | Kiley . |
| 1,505,958 | 8/1924 | Huntting ............... 137/527.2 |
| 1,949,614 | 3/1934 | McDonald . |
| 2,042,301 | 5/1936 | Fox ............... 251/363 |
| 2,143,399 | 1/1939 | Abercrombie ............... 251/362 X |
| 2,190,147 | 2/1940 | Ciaccio et al. ............... 251/363 X |
| 2,324,880 | 7/1943 | Rogers . |
| 2,702,686 | 2/1955 | Fortune . |
| 2,744,539 | 5/1956 | Jones . |
| 2,827,921 | 3/1958 | Sherman . |
| 2,840,337 | 6/1958 | Sasserson et al. ............... 251/363 X |
| 2,864,394 | 12/1958 | Hempel . |
| 2,925,827 | 2/1960 | Anderson et al. . |
| 3,075,547 | 1/1963 | Scaramucci . |
| 3,155,009 | 11/1964 | Murek . |
| 3,173,439 | 3/1965 | Griswold et al. . |
| 3,283,772 | 11/1966 | Ensign . |
| 3,295,550 | 1/1967 | Scaramucci . |
| 3,331,391 | 7/1967 | Merdinyan . |
| 3,478,778 | 11/1969 | Curtiss et al. . |
| 3,479,004 | 11/1969 | Brumm ............... 251/362 X |
| 3,929,316 | 12/1975 | Guthrie ............... 251/363 X |
| 3,996,962 | 12/1976 | Sutherland . |
| 4,188,973 | 2/1980 | Weise et al. . |
| 4,274,436 | 6/1981 | Smith . |
| 4,304,255 | 12/1981 | Prince . |
| 4,477,055 | 10/1984 | Partridge ............... 251/362 X |
| 4,506,864 | 3/1985 | Hartmann ............... 251/363 X |
| 4,508,139 | 4/1985 | Teumer . |
| 4,531,710 | 7/1985 | Tort ............... 251/363 X |
| 4,552,174 | 11/1985 | Carl et al. . |
| 4,669,500 | 6/1987 | Strelow . |
| 4,813,650 | 3/1989 | Dingler . |
| 5,107,888 | 4/1992 | Dunmire . |
| 5,330,158 | 7/1994 | Ellich et al. ............... 251/363 X |

OTHER PUBLICATIONS

Watts Backflow Prevention Products, Watts Regulator Company, pp. 1–28.
Ames Fluid Control Systems, Ames Company.
Ames Detailed Parts Listing, Ames Company, Inc., pp. 1–8.

(List continued on next page.)

*Primary Examiner*—Denise L. Ferensic
*Assistant Examiner*—Ramyar Farid
*Attorney, Agent, or Firm*—Fish & Richardson P.C.

[57] ABSTRACT

A check valve or backflow preventer has a valve mechanism mounted to a valve cover for removal and replacement as a unit. The valve clapper is resiliently supported to accommodate variations in tolerance. The valve seat is removably secured within the valve body by compression of a resilient seal ring to engage opposed walls of the seat and body. A spring pretensioning member facilitates safe replacement and removal of the valve mechanism.

26 Claims, 14 Drawing Sheets

OTHER PUBLICATIONS

Series 007 Double Check Valve Backflow Preventers Installation Service Replacement Parts and Maintenance, Watts Regulator Company, pp. 1–4.

Conbraco Backflow Preventers, Conbraco Industries, Inc., pp. 1–43.

Flomatic Backflow Preventers, Flomatic Corporation, Mar., 1993.

Watts Series 700 Double Check Valve Assembly Field Testing Procedure, Watts Regulator Company.

Series 009 Reduced Pressure Zone Backflow Preventers Installation Service Replacement Parts and Maintenance, Watts Regulator Company, pp. 1–8.

Ames Installation Maintenance and Parts Manual for Backflow Prevention Assemblies, Ames Company, Inc., pp. 1–16.

FEBCO Operations & Maintenance Manual for Reduced Pressure Backflow Preventers, FEBCO, A Division of CMB Industries, Jun., 1989, pp. 1–31.

Wilkins Division Produce Catalog, Zurn Wilkins Division, May, 1994, pp. 1–32.

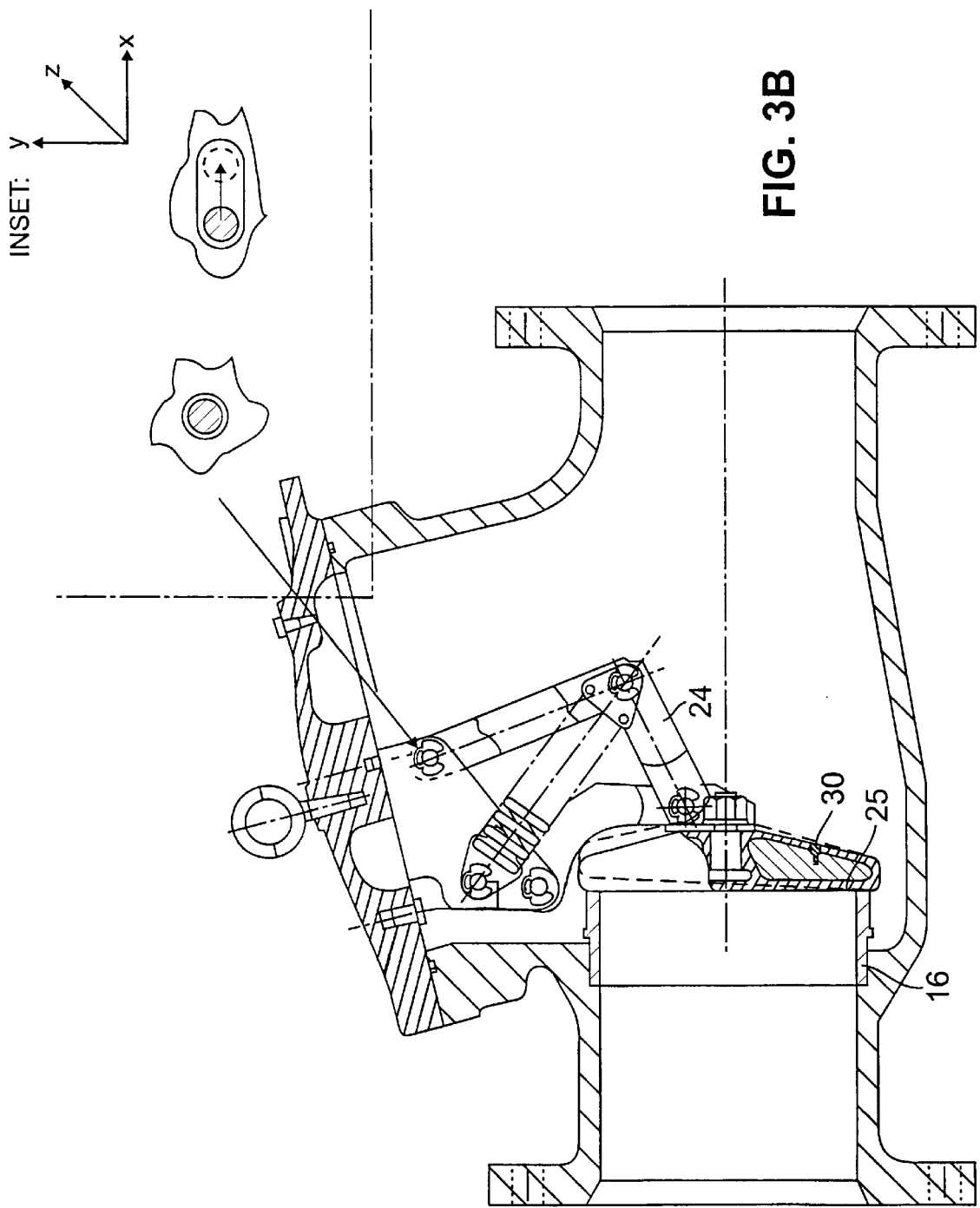

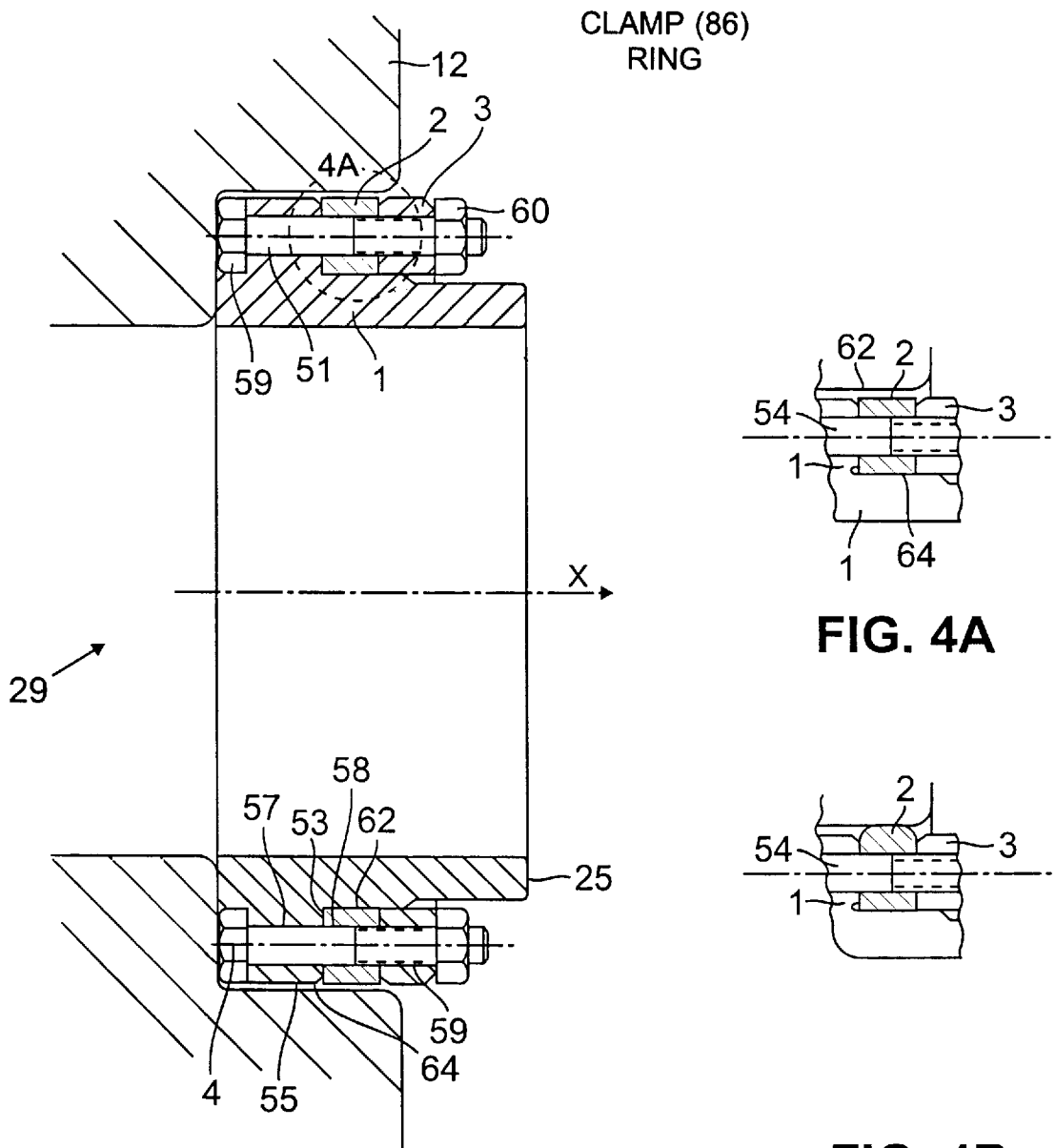

CHECK VALVE AND BACKFLOW PREVENTER

This application is a continuation of U.S. Ser. No. 08/692,944, filed Aug. 7, 1996 now U.S. Pat. No. 5,709,240 which is a continuation-in-part of U.S. Ser. No. 60/002,194, filed Aug. 11, 1995.

BACKGROUND OF THE INVENTION

The invention relates to fluid flow check valves.

A check valve may be employed alone or in series, in the form of a backflow preventer, for allowing flow of fluid above a predetermined differential pressure across a valve element in a first direction, and resisting flow of fluid in the opposite direction.

SUMMARY OF THE INVENTION

According to one aspect of the invention, a valve element comprises a clapper plate formed of relatively rigid material and having an aperture extending therethrough; a clapper body of resilient material encapsulating the aperture and at least a portion of the clapper plate; a support stud having a first end extending into the resilient material of the clapper body and disposed within the aperture of the clapper plate, the first end of the support stud supported by the clapper body in resilient, spaced engagement from the clapper plate; and a valve element seal surface defined by an area of a surface of the valve element. The valve element seal surface, when forcibly held against a mating surface, effects a waterproof seal by resilient contact between the valve element seal surface and the mating surface.

Preferred embodiments of this aspect of the invention may include one or more of the following additional features. The clapper plate defines a central axis with the aperture disposed on the axis. The valve element seal surface is annular in shape. The first end of the support stud extends within the resilient material of the clapper body and has a radial dimension relatively larger than a corresponding radial dimension of the aperture. Additionally, the support stud has a second end extending axially from the first end through the aperture of the clapper plate.

According to another aspect of the invention, a valve seat seal assembly of the type positioned within a bore of a valve assembly housing includes a valve seat ring removably positioned within the bore, the valve seat ring also having an external circumferential surface, an external circumferential shoulder and an axial annular sealing surface; a valve seal ring comprised of resilient deformable material positioned within the valve bore and about the circumferential surface to engage the external circumferential shoulder; a seal clamp ring positioned about the circumferential surface and within the bore of the valve assembly housing to engage the seal ring on a side of the seal ring opposite the external circumferential shoulder; and fastener elements releasably engaged across the valve seat ring and the seal clamp ring, the fastener elements applying a force across the valve seat ring and the seal clamp ring to cause the resilient material of the seal ring to be deformed into sealing and securing engagement between a surface of the valve seat ring and the surrounding bore of the valve assembly housing.

Preferred embodiments of this aspect of the invention may include one or more of the following additional features. The seal clamp ring is embedded within the valve seal ring. The fastener elements are threaded and disposed through the valve seat ring, the seal ring and the seal clamp ring. A circumferential wall defining the valve bore further defines a recess, the resilient, deformable material of the seal ring body disposed in engagement within the recess to resist axial dislodging of the valve seat ring and the valve seal ring from the valve bore. Preferably, the recess comprises one or more grooves or ridges.

According to another aspect of the invention, a valve element biasing mechanism includes a base, a swing arm having a first end, and a second end, the first end hingedly attached to the base, a valve element attached at the second end of the swing arm, the valve element defining a seal surface, a spring having first and second points of attachment, and a pretensioning member having a first end, a second end, a first attachment of the first end of the pretensioning member to the base and a second attachment of the second end of the pretensioning member to the swing arm. The spring, by deflection between the first point of attachment and the second point of attachment, applies a predetermined bias force in opposition between the swing arm and the base, this force hingedly biasing the seal surface of the valve element in a first bias direction toward sealing engagement with an annular seat seal surface of a valve seat. The pretensioning member has a controllable length between the first and second attachments selected to bias the valve seal surface in a second bias direction with the predetermined bias force.

Preferred embodiments of this aspect of the invention may include one or more of the following additional features. The valve element biasing mechanism further includes a first linkage arm having first and second ends, and a second linkage arm having first and second ends. The spring, at its first point of attachment, has a region of intersection of the first end of the first linkage arm and the first end of the second linkage arm, the first linkage arm having its second end hingedly attached to the base, and the second linkage arm having its second end hingedly attached to the element swing arm, the spring having its second end hingedly attached to the base, the linkage arms causing the bias force from the spring to be applied by mechanical advantage between the base and the element swing arm. The first attachment of the pretensioning member comprises the first linkage arm in a region between its first end and its second end. The second attachment of the pretensioning member comprises the second linkage arm in a region between its first end and its second end. The pretensioning member is disposed in engagement with the first linkage arm and the second linkage arm, whereby adjustment of the pretensioning members relative to at least one of the first and second attachments causes the controllable length between attachments to be adjusted in a first direction. The pretensioning assembly further comprises a length control link disposed about the pretensioning member and having a length preselected to limit adjustment of the pretensioning member, e.g. in the first direction. Adjustment of the pretensioning member relative to its points of attachment is accomplished, e.g., by axial travel of the pretensioning member resulting from rotation of the pretensioning member in threaded engagement with one or more of its attachments.

According to another aspect of the invention, a check valve comprises a valve housing defining a passageway for flow of fluid therethrough between an inlet and an outlet, a chamber region of the passageway disposed between the inlet and the outlet, a valve bore between the inlet and chamber, and an access opening to the chamber region; a valve annular seat seal surface in the valve bore; a valve housing cover removably securing the opening to the chamber region; a valve element defining a valve element seal area pivotally mounted within the valve housing for movement between a first position in sealing engagement with the valve seat for resisting flow of fluid between the inlet and the outlet, and a second position removed from the valve seat to allow flow of fluid between the inlet and the outlet; and a valve element biasing mechanism supporting the valve element. The valve element biasing mechanism and the valve element are mounted to the valve cover housing, with the valve element biased in a first direction toward the first position. The valve housing cover, valve element biasing mechanism and valve element are removable from the valve housing and replaceable as a unit.

In preferred embodiments of this aspect of the invention, the check valve may include one or more of the valve element, valve seat seal assembly, and valve element biasing mechanism, all as described above.

According to another aspect of the invention, a backflow preventer comprises a valve housing defining a passageway for flow of fluid therethrough between an inlet and an outlet, with first and second chamber regions disposed in sequence between the inlet and the outlet, each containing a check valve with a valve housing cover, a valve element biasing mechanism and a valve element removable and replaceable as a unit, as described above.

These and other features and advantages will be apparent from the following description of presently preferred embodiments, and from the claims.

BRIEF DESCRIPTION OF THE DRAWINGS

FIG. 3B is a side section view of a check valve of FIG. 1 with a resilient valve element of FIG. 3.

FIG. 4 is a side section view of a valve seat seal assembly used, for example, with a check valve or backflow preventer of the invention.

FIGS. 4A and 4B are side section views of a portion of the valve seal assembly of FIG. 4 with the seal ring in its uncompressed and compressed states, respectively.

DESCRIPTION OF THE PREFERRED EMBODIMENTS

Figure 1:
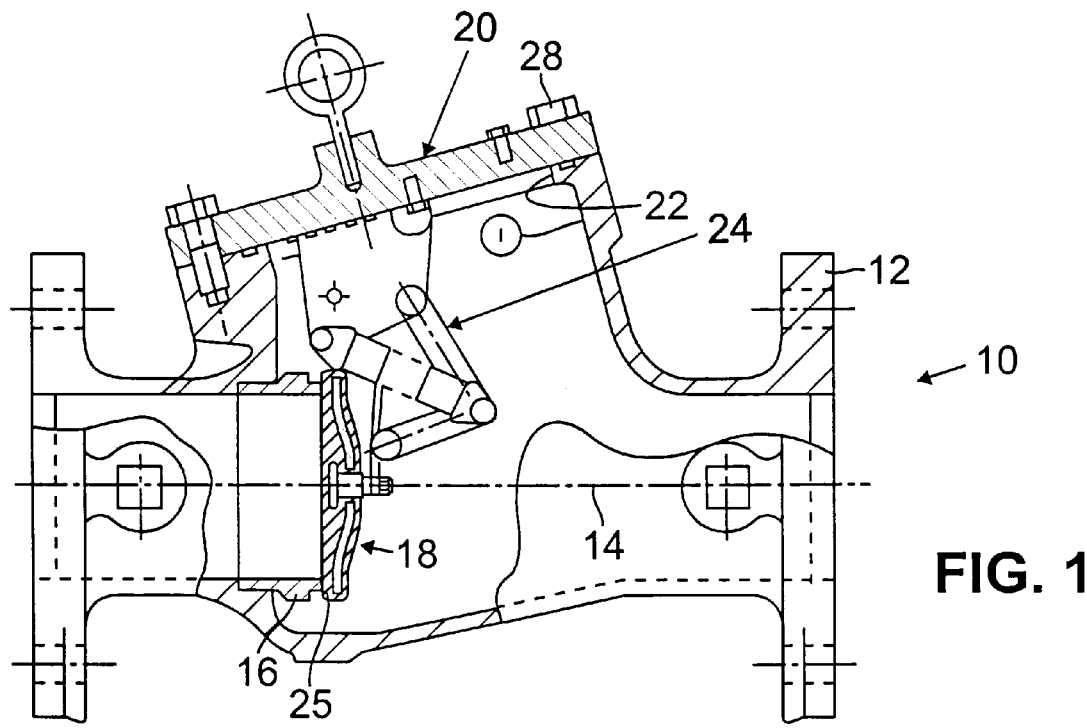
FIG. 1 is a side section view of a check valve of the invention.

Referring to FIG. 1, a check valve 10 of the invention has a housing 12 defining an axial flow passageway 14 therethrough. A valve seat ring 16 is positioned within housing 12, and includes an annular seal surface 25 which engages a valve element seal surface of a spring-biased valve element 18. Access to the valve seat ring 16 and valve element 18 is provided through a removable valve cover 20 mounted over an access opening port 22 defined by the housing 12.

Figure 1C:
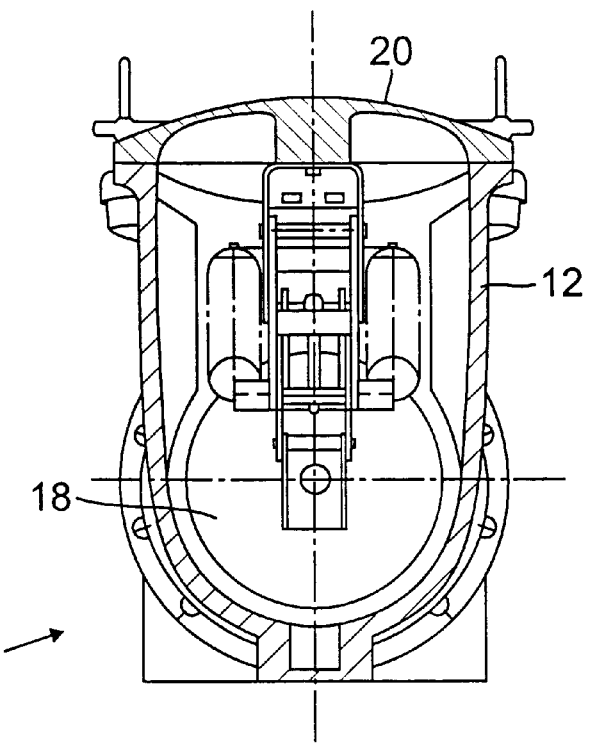
FIGS. 1B and 1C are side and end section views, respectively, of an alternate embodiment of a backflow preventer including a series arrangement of first and second check valves of the invention.
Figure 1A:
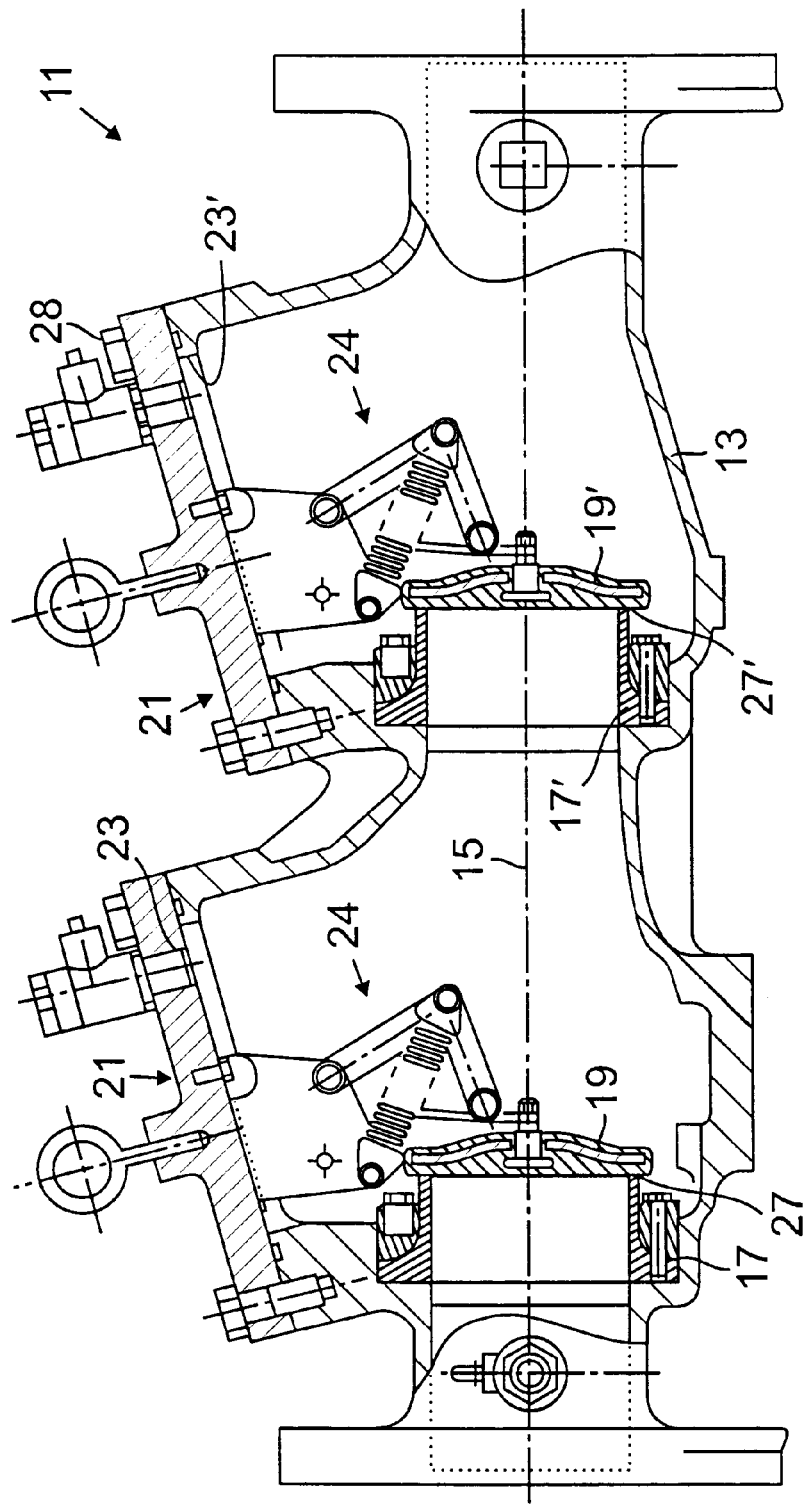
FIG. 1A is a side section view of a backflow preventer including a series arrangement of first and second check valves of the invention.

Referring to FIG. 1A, a backflow preventer 11 of the invention consists of a pair of check valves of the type described in conjunction with FIG. 1. The check valves are disposed in series within a housing 13 and define an axial flow passageway 15 through the backflow preventer 11. Valve seat rings 17, 17' are positioned within housing 13 and have a pair of valve annular seat seal surfaces 27, 27' which respectively engage spring-biased valve elements 19, 19'. As with check valve 10, access to the valve seat rings 17, 17' and valve elements 19, 19' is provided through removable valve covers 21, 21' mounted over access opening ports 23, 23' defined by the housing 13.

Figure 1B:
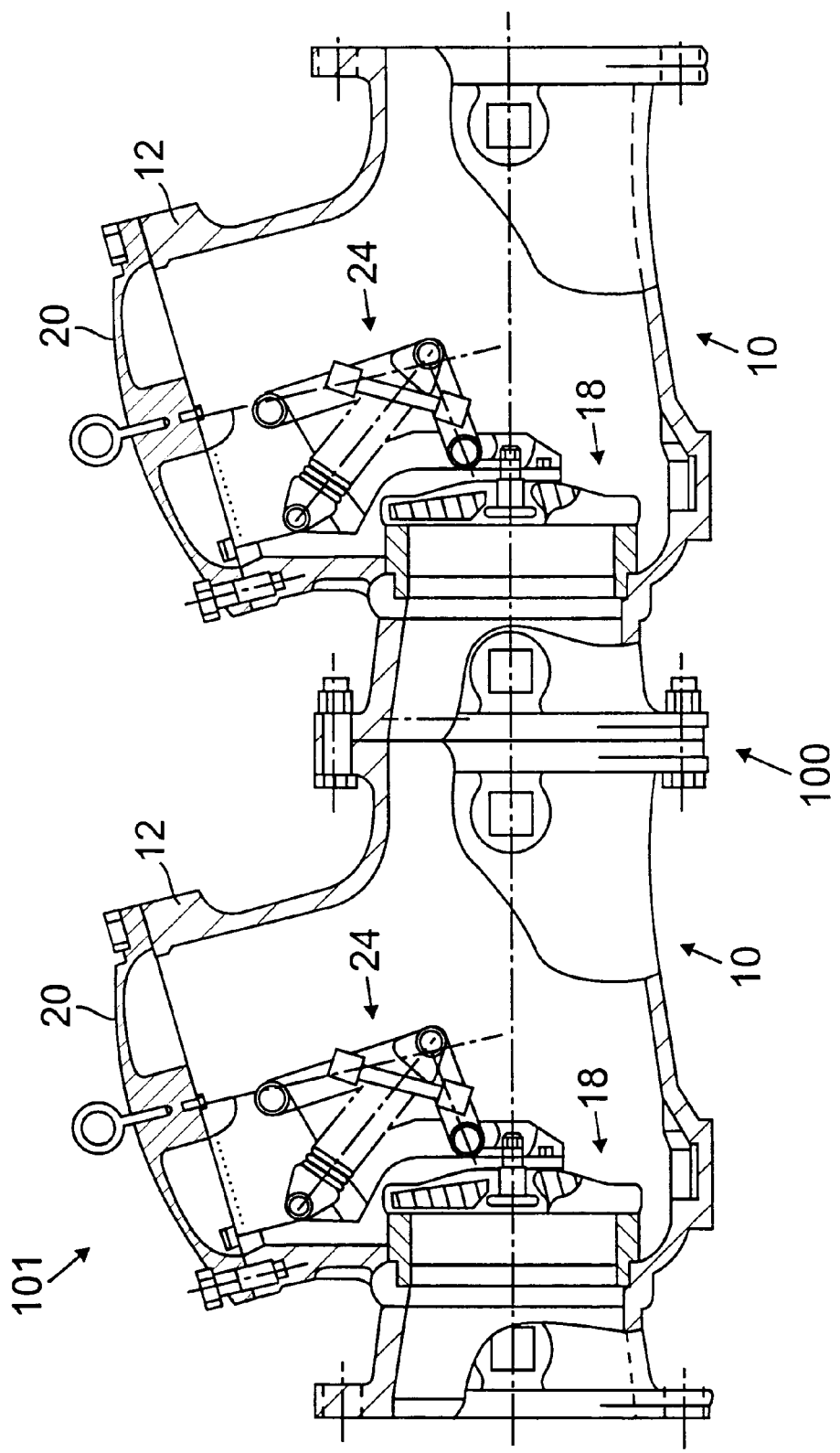

Referring to FIGS. 1B and 1C, in an alternate embodiment, a backflow preventer 101 of the invention includes a pair of check valves 10, e.g. as described above in conjunction with FIG. 1. The two housings 12 of the check valves are connected by a sealed mechanical joint, such as by flanged ends 100, or by a grooved coupling assembly 100 to form a housing assembly of the backflow preventer. Backflow preventer 101 encompasses, in all other respects, the features of backflow preventer 11 described above in conjunction with FIG. 1A.

For reasons of economy, embodiments of the invention will now be described primarily with reference to the check valve of FIG. 1. It will be appreciated that the features described are applicable to the check valves used in the backflow preventers of FIGS. 1A and 1B.

In certain embodiments of the invention, the valve element biasing mechanism 24 supporting the valve element 18 is mounted to the cover 20, allowing removal and replacement of the cover and valve element biasing mechanism as a unit.

Figure 2:
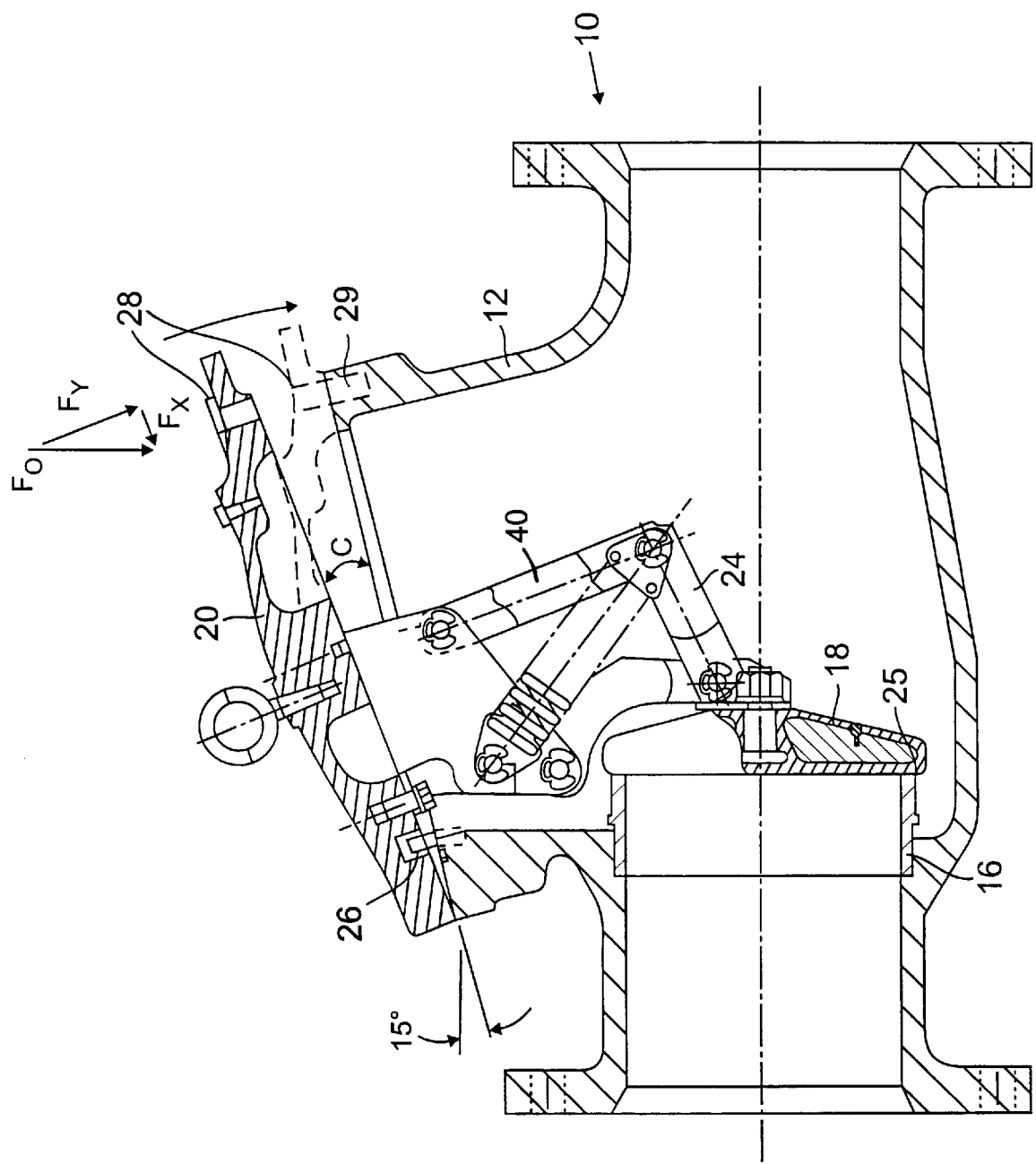
FIG. 2 is a side section view of a check valve of FIG. 1 with its cover partially removed.

Furthermore, referring to FIG. 2, to facilitate safe replacement of the spring-biased valve element biasing mechanism 24, the cover 20 engages a dowel 26 extending from the housing 12 adjacent to the port 22. The valve element 18 is then positioned generally in engagement with the annular seat seal surface 25 of the valve seat ring 16. At this point, the cover 20 is disposed at an angle, C (e.g. about 15° to 20°), to the surface about the port 22. The valve cover is then pulled into snug engagement with housing 12 by tightening bolt 28 which extends through a hole 29 at a position along the periphery of the housing opposite the dowel. Tightening of bolt 28 safely tensions the valve mechanism 24 and causes the valve element 18 to be forcibly loaded against the annular seat seal surface 25 of the valve seat ring 16. The process is reversed for removal of the valve mechanism.

In contrast, in prior art check valves, where the valve mechanism is typically mounted to the body in the region of a port, the task of tensioning and untensioning the valve mechanism, typically in tight quarters, can be difficult and, in larger valves, where the tension force can be quite large, this task is often dangerous.

Figure 3:
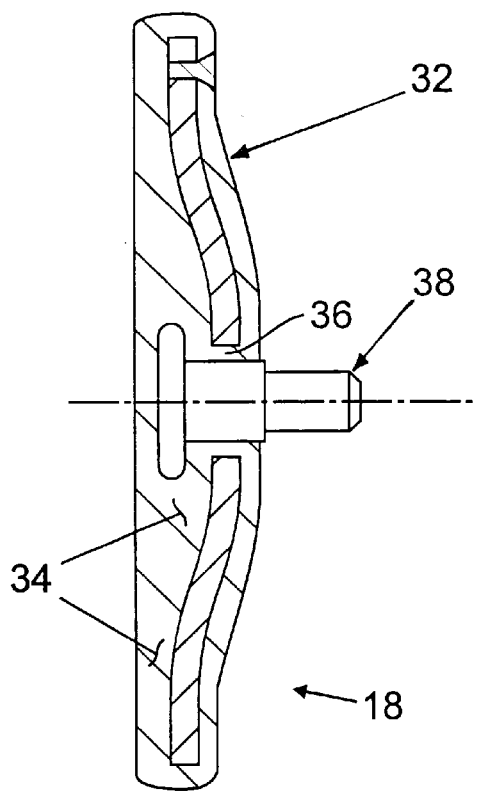
FIG. 3 is a side view, partially in section, of a valve element of the invention.
Figure 3A:
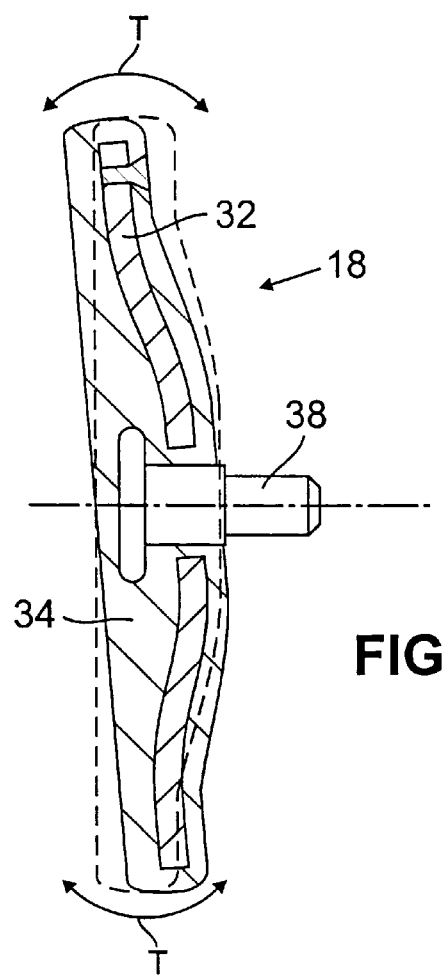
FIG. 3A is a similar view of the valve element of FIG. 3 with the clapper plate resiliently displaced from a plane perpendicular to the axis of the support stud.

Referring now to FIGS. 3 and 3A, according to another aspect of the invention, valve element 18 includes a rigid clapper plate 32 and a clapper body 34 formed of an elastomeric material, such as resilient rubber. The clapper plate 32 includes an aperture 36 within the resilient clapper body 34, with the valve element 18 mounted to the valve mechanism 24 (FIG. 3B) by a support stud 38 extending into the aperture 36. The support stud is spaced from the clapper plate 32 by the surrounding resilient material of the clapper body 34.

Referring to FIGS. 3A and 3B, as a result of this arrangement, the valve element 18 is able to move resiliently (arrows T, FIG. 3A; and dashed line positions, FIGS. 3A and 3B) relative to the annular seat seal surface 25 of the valve seat ring 16 in a manner to adjust for variation in tolerances, including variations in the location of the cover 20 and attached valve element biasing mechanism 24 due to machining tolerances of the bolt 28 locations.

Referring next to FIG. 4, according to another aspect of the invention, the removable valve seat seal assembly 29 is secured relative to the housing 12 by the mechanical action of its component parts. The valve seat seal assembly is defined by a removable valve seat ring 1, a valve seal ring 2, and a seal clamp ring 3. The valve seat ring 1 is formed of a relatively rigid material, such as metal or plastic and has surfaces that include an exterior surface 55, which fits relatively closely within the body bore 64 of the housing 12; a sealing diameter surface 62; a clamp seal surface 53; and an annular seat seal surface 25. The seal ring 2 is formed of a resilient material and is positioned in close proximity to the sealing surface 62 and clamp seal surface 53 of the valve seat ring 1. The seal clamp ring 3 is formed of a material more rigid than that of the seal ring 2 and is positioned on a side of the seal ring 2 away from the clamp seal surface 53 of the valve seat ring. The mechanical action of the valve seat seal assembly 29 is achieved using fastener elements 51 which support the seal ring 2 between the valve seat ring 1 and seal clamp ring 3. In this embodiment of the invention, the fastener elements 51 include threaded bolts 54 and nuts 60. The components of valve seat seal assembly 29 are loosely assembled prior to being installed within body bore 64. The threaded bolts 54 are received through holes 57 in the valve seat ring 1, holes 58 in the seal ring 2, and holes 59 in the seal clamp ring 3. Mating nuts 60 are threaded onto the threaded bolts 54 to secure the assembly together. The valve seat seal assembly 29 is then slid with relatively loose fit into the body bore 64.

Referring also to FIG. 4A, as the nuts 60 are tightened, the resilient material of the seal ring 2 is deformed laterally into engagement with the opposed surfaces 62, 64 of the seat ring 1 and the body bore 64 of the valve housing 12, respectively, thereby securing the valve seat seal assembly 29 to the housing 12 and providing a watertight seal between the annular seat seal surface 25 and the body bore 64.

This aspect of the invention is particularly applicable in valves used in controlling the flow of corrosive materials. Such valves typically have inner surfaces coated with a protective material (e.g. epoxy or PTFE (TEFLON®)). The invention maintains the integrity of the surface coating by eliminating the need for attachments or machine operations in the wall of the housing to secure the removable valve seat.

Figure 5:
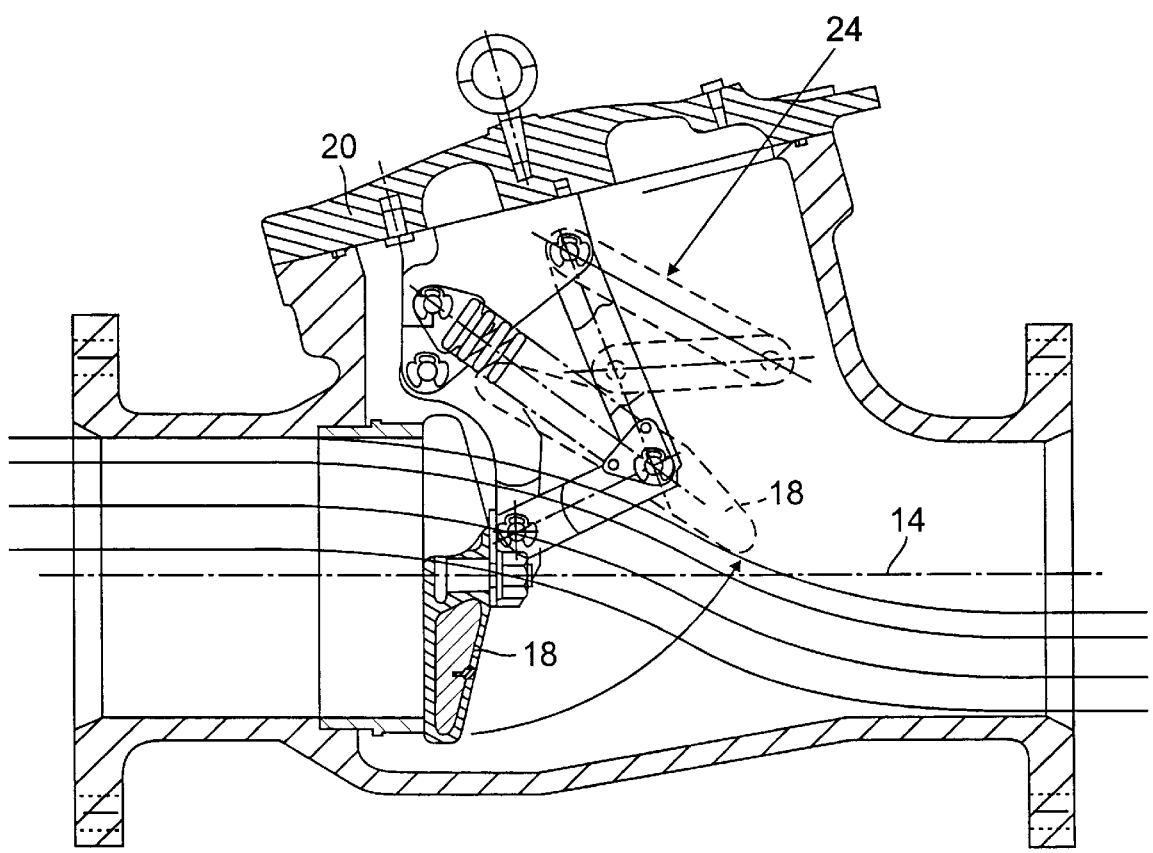
FIG. 5 is a side section view of a check valve of the invention with the valve element shown biased towards sealing engagement with the annular seat seal surface of the valve seat ring (solid lines), and shown also removed from the flow stream (dashed lines).

Referring to FIG. 5, mounting of the valve mechanism 24 to the cover 20 allows the valve element 18 to move substantially out of the flow path 14, resulting in a relative lower loss of pressure through the valve.

Figure 6:
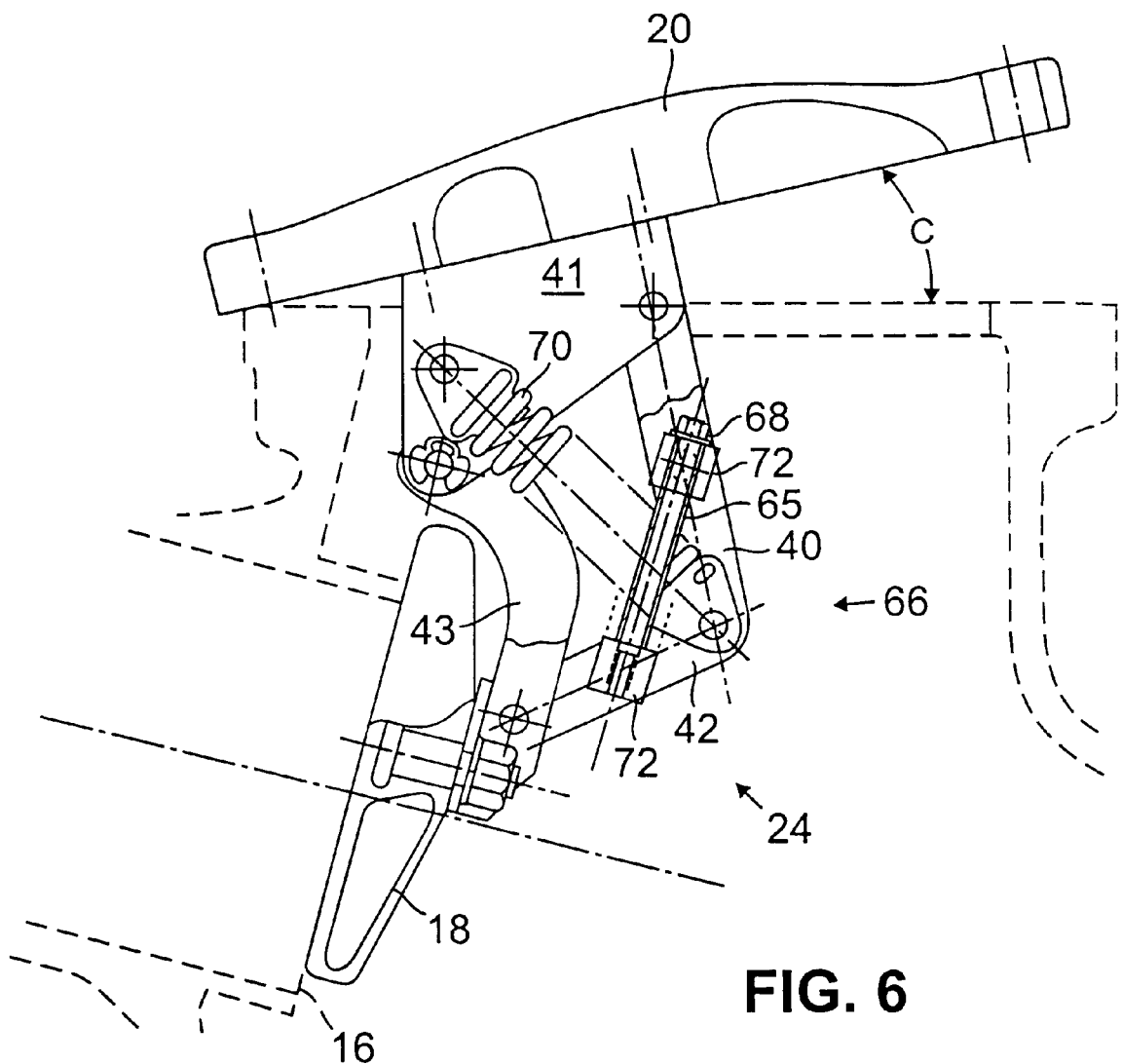
FIGS. 6, 7 and 8 are side section views of an embodiment of a valve mechanism of the invention having a valve mechanism pretensioning member.
Figure 7:
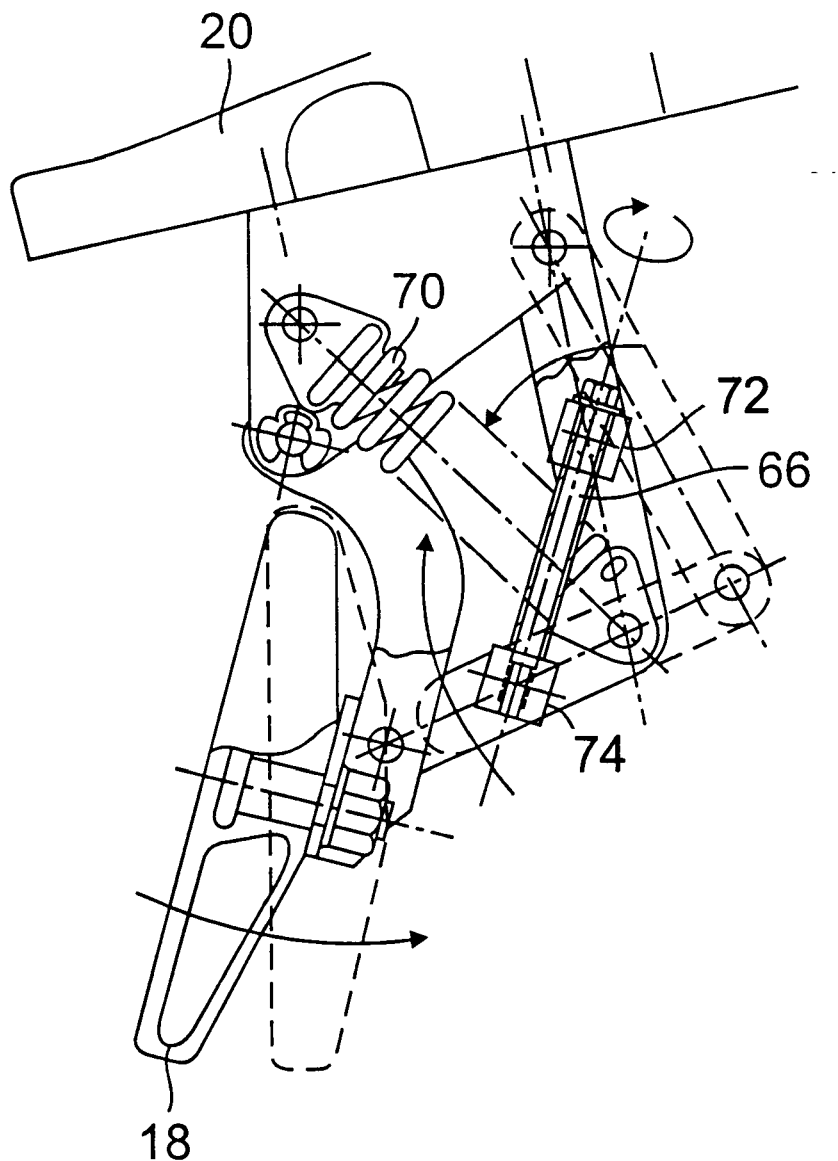
Figure 8:
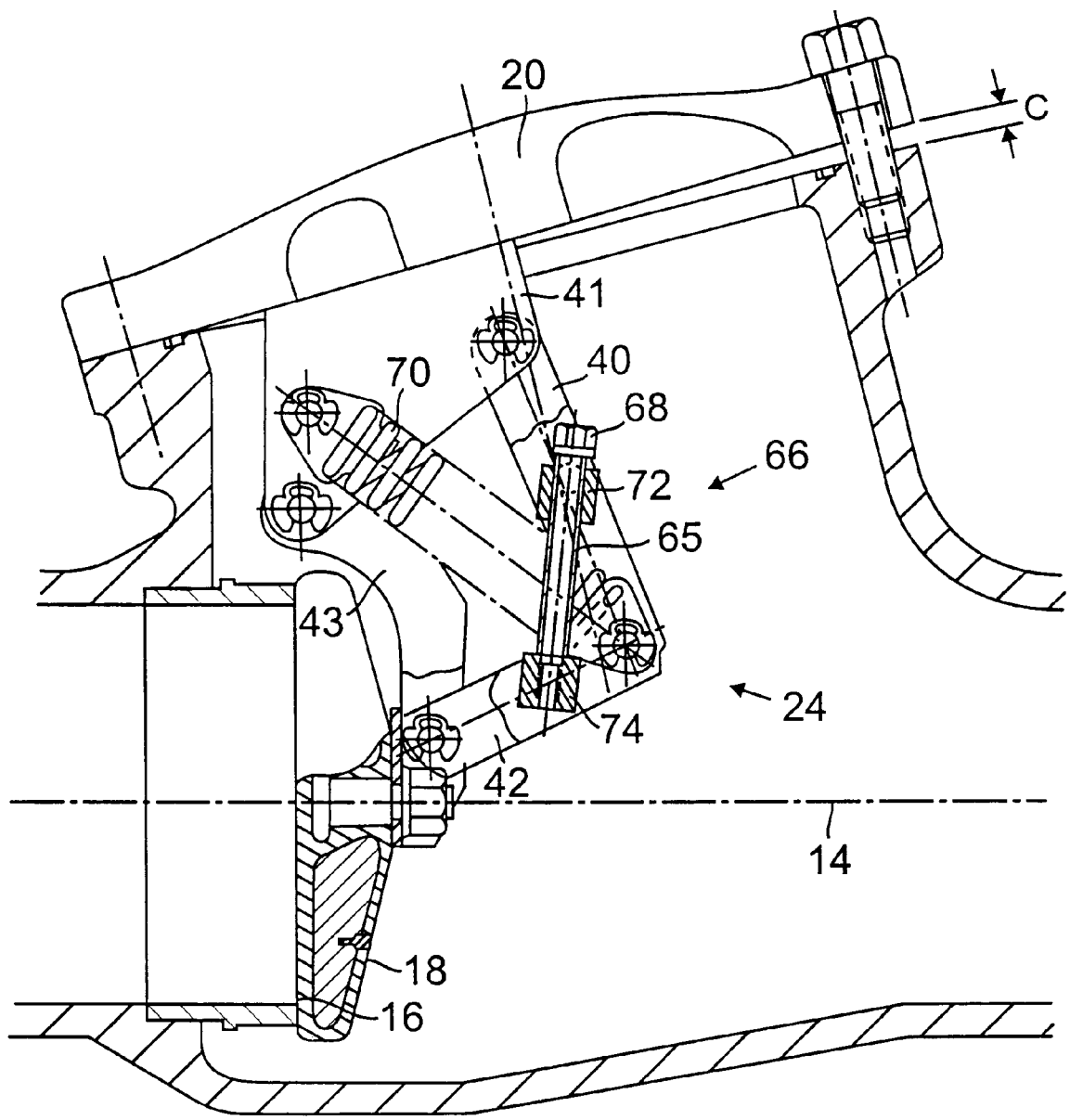

Referring to FIGS. 6–8, according to another aspect of the invention, a pretensioning assembly 66 includes a pretensioning member 65 extending between a first attachment 40 attached to a base 41, and a second attachment 42 attached to an element swing arm 43 of the spring-biased valve mechanism 24. To adjust the angle, C, between the cover 20 and housing 12 for installation, the length between the attachments is changed by adjusting the pretensioning member 65 to change the angular relationship between the valve element 18 and the cover 20. At the same time, the pretension of the spring 70 biasing the valve element 18 upon the annular seat seal surface 25 of the seat 16 is changed.

In this embodiment of the invention, the length between the attachments is adjusted by rotating the pretensioning member 65 in threaded engagement with one or more of the bar nuts 72, 74. The bar nuts are pivotally mounted to the attachments 40, 42 of the spring-biased valve mechanism 24.

Figure 8A:
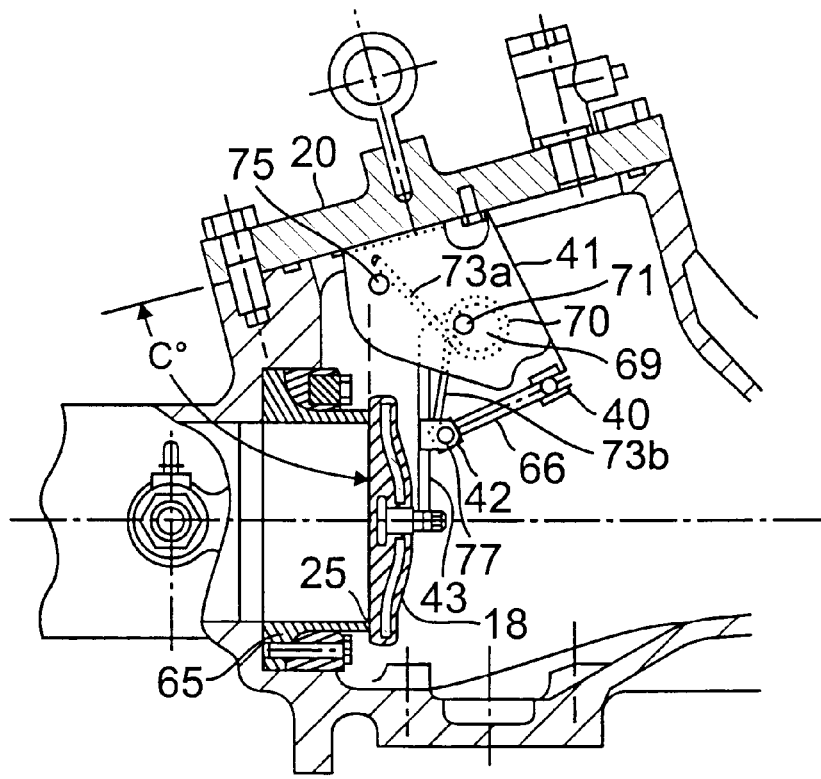
FIGS. 8A and 8B are side and end section views, respectively, of an alternate embodiment of a valve mechanism of the invention having a valve mechanism pretensioning member.
Figure 8B:
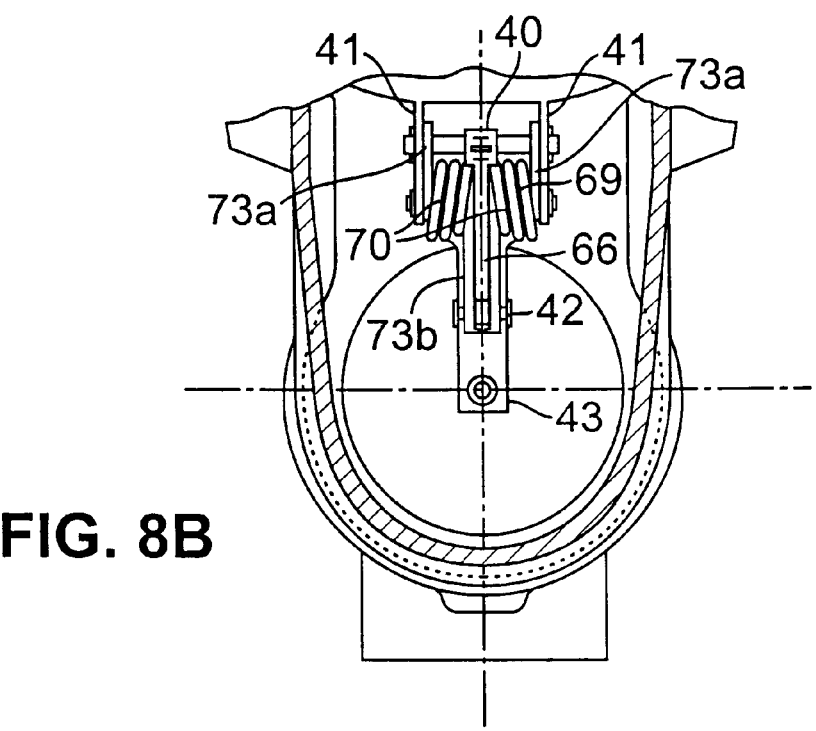

It is also appreciated that the spring which biases the valve element into engagement with annular seat seal surface 25 of seat 16 may take other forms. For example, as shown in FIGS. 8A and 8B, a pair of springs 70a are positioned between base plates 41 and second attachment 42. Springs 70a are of the type having a coiled central portion 69 supported on a pin 71 formed on base plates 41. Spring 70a also includes a first leg element 73a which contacts a pin 75 formed on base plate 41 and second leg element 73b which contacts a pin 77 attached to second attachment 42.

Other embodiments are also contemplated. For example, referring to FIGS. 9 and 9A, in another valve seat seal assembly 16' of the invention, a removable valve seat ring 44 is secured to the housing 12 by a deformable seal ring assembly 46, which consists of a rigid core ring 48 encapsulated within a resilient body 49 formed of elastomeric material (e.g., rubber). The fastener elements 51' forming a part of the valve seat seal assembly 16' include threaded bolts 54 and washers 56. The threaded bolts 54 are received through the washers 56 and through the holes 58 in the deformable seal ring assembly 46. The threaded bolts 54 are then loosely engaged in corresponding threaded apertures 60 in the seat ring 44. The valve seat seal assembly 16' is slid with a relatively loose fit into a body bore 64 defined by the housing 12, and then secured within the body bore 64 by tightening the threaded bolts 54, thereby compressing the resilient body 49 of the deformable seal ring assembly 46 and causing it to expand laterally. Referring also to FIG. 9A, as the bolts 54 are tightened, the material of the resilient body 49 is deformed into engagement with the opposed surfaces 62, 64 of the seat ring 44 and the valve housing 12, thereby securing the seat ring within the housing and providing a seal between opposing surfaces of the ring and housing.

Figure 9:
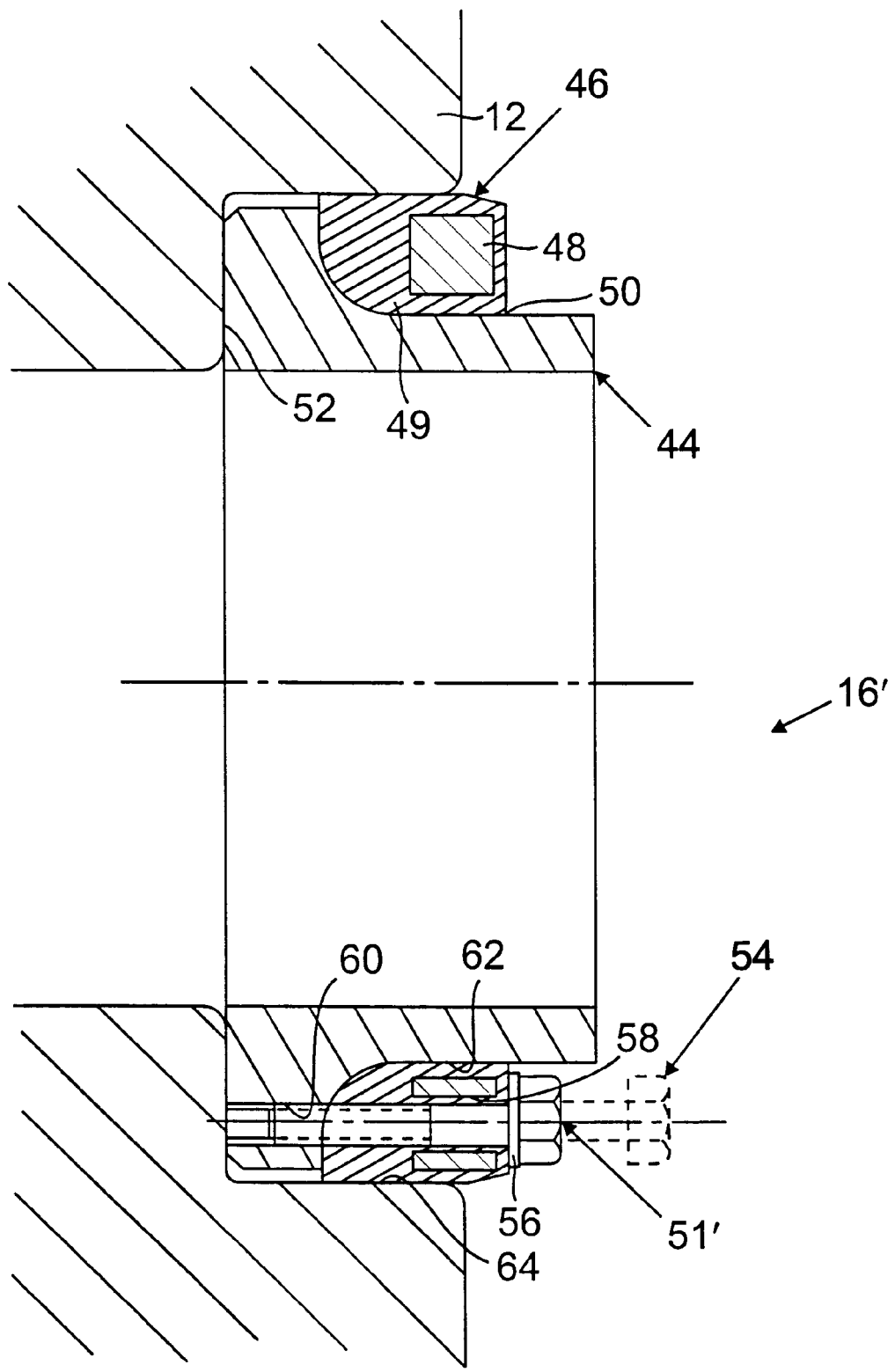
FIGS. 9 and 9A are side section views of an alternate embodiment of the valve seat seal ring assembly.
Figure 9A:
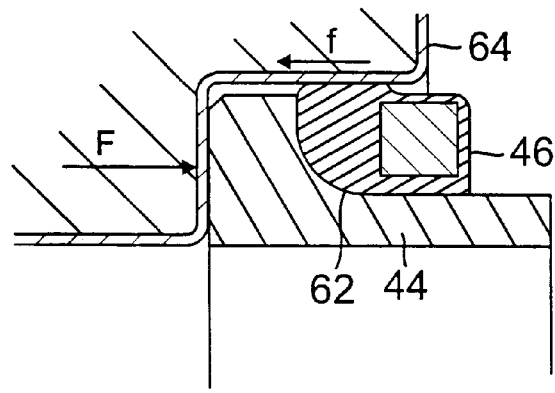

In other embodiments of the invention, the deflection of the resilient material of the valve seat seal assembly 16' to secure and seal the assembly to the housing 12 may be accomplished by the mechanical action of other mechanical devices, such as a cantilever device or a cam-lock device, rather than by the action of the fastener elements 51 described here in conjunction with FIG. 9.

Figure 10:
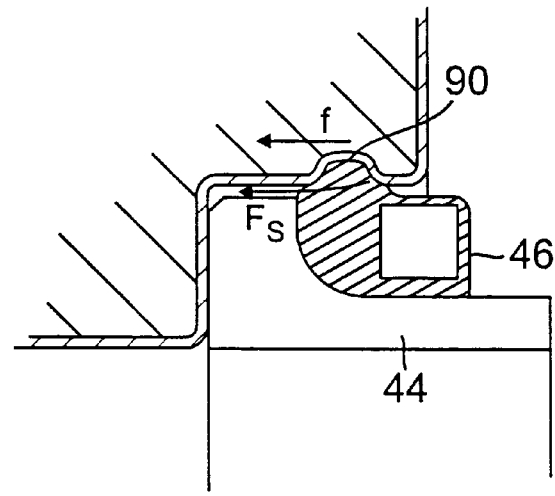
FIGS. 10 and 11 are side section views of the valve seat seal ring assembly of FIG. 9 with the seal ring secured within body bores having a groove and threads, respectively.
Figure 11:
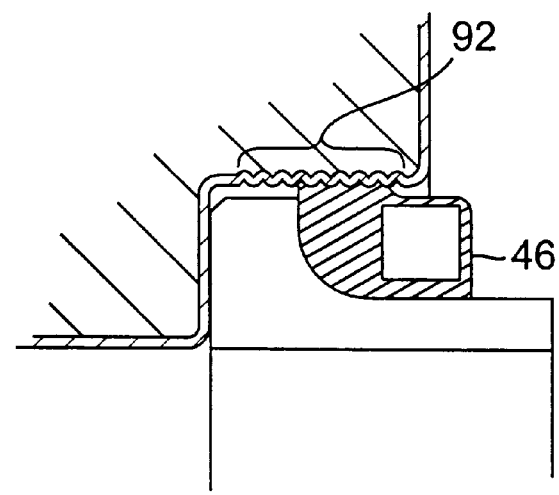

The housing 12 may define one or more grooves 90 (FIG. 10) or ridges 92 (FIG. 11) for improve frictional engagement and seal with the seat ring.

Other embodiments are within the following claims.

What is claimed is:

1. A valve seat seal assembly of the type positioned within a bore of a valve assembly housing, said valve seat seal assembly comprising:

a valve seat ring removably positioned within said bore defined by said valve assembly housing, said valve seat ring having an external circumferential surface, an external circumferential shoulder and an axial annular sealing surface;

a valve seal ring comprised of a resilient deformable material, positioned within said bore of said valve assembly housing and about said circumferential surface for engagement with said external circumferential shoulder;

a seal clamp ring positioned about said circumferential surface and within said bore of said valve assembly housing for engagement with said valve seal ring on a side of said valve seal ring opposite said external circumferential shoulder; and fastener elements releasably engaged between said valve seat ring and said seal clamp ring, said fastener elements applying a force across said valve seat ring and said seal clamp ring to cause said resilient material of said seal ring to deform into sealing and securing engagement between a surface of said valve seat ring and an internal circumferential surface of said bore of said valve assembly housing.

2. The valve seat seal assembly of claim 1 wherein said fastener elements are threaded and disposed through said valve seat ring, said seal ring and said seal clamp ring.

3. The valve seat seal assembly of claim 1 wherein a circumferential wall defining said valve bore further defines a recess, said resilient, deformable material of said seal ring disposed for engagement with said recess to resist dislodgement of said valve seal ring from said bore.

4. The valve seat seal assembly of claim 3 wherein said recess comprises one or more grooves.

5. The valve seat seal assembly of claim 3 wherein said recess comprises one or more ridges.

6. The valve seat seal assembly of claim 1 wherein said seal clamp ring is embedded within said valve seal ring.

7. A valve element biasing mechanism comprising:

a base, a swing arm having a first end and a second end, said first end hingedly attached to said base, a valve element attached at said second end of said swing arm and defining a seal surface, a spring, having a first point of attachment and a second point of attachment, said spring, by deflection between said first point of attachment and said second point of attachment, causing a predetermined bias force to be applied in opposition between said swing arm and said base, said predetermined bias force hingedly biasing said seal surface of said valve element in a first bias direction toward sealing engagement with an annular seat seal surface of a valve seat, and a pretensioning member having a first end, a second end, a first attachment of said first end of said pretensioning member to said base and a second attachment of said second end of said pretensioning member to said swing arm, said pretensioning member being adjustable relative to at least one of said first attachment and said second attachment to define a controllable length between said first attachment and said second attachment, adjustment of said controllable length being selected to bias said valve seal surface in a second bias direction with said predetermined bias force.

8. The valve element biasing mechanism of claim 7, further comprising a first linkage arm having a first end and a second end, and a second linkage arm having a first end and a second end, wherein said spring, at its said first point of attachment, defines a region of intersection of said first end of said first linkage arm and said first end of said second linkage arm, said second end of said first linkage arm hingedly attached to said base and said second end of said second linkage arm hingedly attached to said element swing arm, and said second end of said spring hingedly attached to said base, said predetermined bias force from said spring being applied by said first and second linkage arms by mechanical advantage between said base and said element swing arm, said first attachment of said pretensioning member comprising said first linkage arm in a region between its said first end and its said second end, and said second attachment of said pretensioning member comprising said second linkage arm in a region between its said first end and its said second end, said pretensioning member disposed in engagement with said first linkage arm and said second linkage arm, whereby, adjustment of said pretensioning member relative to at least one of said first attachment and said second attachment adjusts said controllable length between said first attachment and said second attachment in a first direction.

9. The valve element biasing mechanism of claim 8, wherein at least one end of said pretensioning member is disposed in threaded engagement with one of said first and second linkage arms.

10. The valve element biasing mechanism of claim 8, further comprising a length control link disposed about said pretensioning member, said length control link having a length preselected to limit adjustment of said pretensioning member in said first direction, thereby limiting said bias of said valve seal surface in said second bias direction.

11. A check valve comprising:

a valve housing defining a passageway for flow of fluid therethrough between an inlet and an outlet, a chamber region of said passageway disposed between said inlet and said outlet, a valve bore between said inlet and said chamber region, an access opening to said chamber region, and a valve seat with an annular valve seat seal surface in said valve bore;

a valve housing cover removably securing said access opening to said chamber region;

a valve element defining a valve element seal surface pivotally mounted within said valve housing for movement between a first position in sealing engagement with said valve seat for resisting flow of fluid between said inlet and said outlet of said passageway, and a second position removed from said valve seat to allow flow of fluid between said inlet and said outlet; and a valve element biasing mechanism supporting said valve element, said valve element biasing mechanism and said valve element mounted to said valve cover housing, with said valve element biased in a first direction toward said first position;

said valve housing cover, said valve element biasing mechanism and said valve element being removable from said valve housing and replaceable as a unit;

said valve element biasing mechanism further comprising:

a base;

a swing arm having a first end and a second end, said first end hingedly attached to said base and said second end attached to said valve element, a spring, having a first point of attachment and a second point of attachment, said spring, by deflection between said first point of attachment and said second point of attachment, causing a predetermined bias force to be applied in opposition between said swing arm and said base, said predetermined bias force hingedly biasing said seal surface of said valve element in a first bias direction toward sealing engagement with an annular seat seal surface of a valve seat, and a pretensioning member having a first end, a second end, a first attachment of said first end of said pretensioning member to said base, and a second attachment of said second end of said pretensioning member to said swing arm, said pretensioning member being adjustable relative to at least one of said first attachment and said second attachment to define a controllable length between said first attachment and said second attachment, adjustment of said controllable length selected to bias said valve seal surface in a second bias direction with said predetermined bias force.

12. The check valve of claim 11, wherein said valve element seal surface comprises an annular surface area of said valve element.

13. A check valve comprising:

a valve housing defining a passageway for flow of fluid therethrough between an inlet and an outlet, a chamber region of said passageway disposed between said inlet and said outlet, a valve bore between said inlet and said chamber region, an access opening to said chamber region, and a valve seat with an annular valve seat seal surface in said valve bore;

a valve housing cover removably securing said access opening to said chamber region;

a valve element defining a valve element seal surface pivotally mounted within said valve housing for movement between a first position in sealing engagement with said valve seat for resisting flow of fluid between said inlet and said outlet of said passageway, and a second position removed from said valve seat to allow flow of fluid between said inlet and said outlet;

a valve element biasing mechanism supporting said valve element, said valve element biasing mechanism and said valve element mounted to said valve cover housing, with said valve element biased in a first direction toward said first position;

a valve seat seal assembly comprising:

a valve seat ring removably positioned within said valve bore defined by said valve housing, said valve seat ring having an external circumferential surface, an external circumferential shoulder and axial annular sealing surface;

a valve seal ring comprised of a resilient deformable material, positioned within said bore of said valve housing and about said circumferential surface for engagement with said external circumferential shoulder;

a seal clamp ring positioned about said circumferential surface and within said bore of said valve housing to engage said valve seal ring on a side of said valve seal ring opposite said external circumferential shoulder; and fastener elements releasably engaged between said valve seat ring and said seal clamp ring, said fastener elements applying a force across said valve seat ring and said seal clamp ring to cause said resilient material of said seal ring to deform into sealing and securing engagement between a surface of said valve seat ring and an internal circumferential surface of said bore of said valve housing;

said valve housing cover, said valve element biasing mechanism and said valve element being removable from said valve housing and replaceable as a unit.

14. The check valve of claim 13 wherein said fasteners elements are threaded and disposed through said valve seat ring, said seal ring and said seal clamp ring.

15. The check valve of claim 13 wherein a circumferential wall defining said valve bore further defines a recess, said resilient, deformable material of said seal ring disposed for engagement with said recess to resist dislodging said valve seal ring from said bore.

16. The check valve of claim 15 wherein said recess comprises one or more grooves.

17. The check valve of claim 15 wherein said recess comprises one or more ridges.

18. The check valve of claim 11, further comprising a first linkage arm having a first end and a second end, and a second linkage arm having a first end and a second end; wherein said spring, at its said first point of attachment, defines a region of intersection of said first end of said first linkage arm and said first end of said second linkage arm, said second end of said first linkage arm hingedly attached to said base, and said second end of said second linkage arm hingedly attached to said element swing arm, and said second end of said spring hingedly attached to said base, said predetermined bias force from said spring being applied by said first and second linkage arms by mechanical advantage between said base and said element swing arm, said first attachment of said pretensioning member comprising said first linkage arm in a region between its said first end and its said second end, and said second attachment of said pretensioning member comprising said second linkage arm in a region between its said first end and its said second end, said pretensioning member disposed in engagement with said first linkage arm and said second linkage arm, whereby, adjustment of said pretensioning member relative to at least one of said first attachment adjusts said controllable length between said first attachment and said second attachment in a first direction.

19. The check valve of claim 18, wherein at least one end of said pretensioning member is disposed in threaded engagement with one of said first and second linkage arms.

20. The check valve of claim 18, further comprising a length control link disposed about said pretensioning member, said length control link having a length preselected to limit adjustment of said pretensioning member in said first direction, thereby limiting said bias of said valve seal surface in said second bias direction.

21. A backflow preventer comprising:

a valve housing defining a passageway for flow of fluid therethrough between an inlet and an outlet, a first chamber region and a second chamber region of said passageway disposed in sequence between said inlet and said outlet, a first access opening to said first chamber region and a second access opening to said second chamber region, a first valve bore between said inlet and said first chamber region and a second valve bore between said first chamber region and said second chamber region, and a first valve seat in said first valve bore and a second valve seat in said second valve bore;

a first valve housing cover removably securing said first access opening to said first chamber region, and a second valve housing cover removably securing said second access opening to said second chamber region;

a first valve element defining a valve element seal surface pivotally mounted within said valve housing for movement between a first position in sealing engagement with said first valve seat seal assembly for resisting flow of fluid through said passageway, between said inlet and said outlet of said passageway, and a second position removed from said first valve seat seal assembly, and a second valve element defining a second valve element seal surface pivotally mounted within said valve housing for movement between a first position in sealing engagement with said second valve seat seal assembly for resisting flow of fluid through said passageway, between said inlet and said outlet of said passageway, and a second position removed from said second valve seat seal assembly, said first valve element and said second valve element in their respective said second positions allowing flow of fluid through said passageway between said inlet and said outlet; and a first valve element biasing mechanism supporting said first valve element, said first valve element biasing mechanism and said first valve element mounted to said first valve cover housing, with said first valve element biased toward its said first position, and a second valve element biasing mechanism supporting said second valve element, said second valve element biasing mechanism and said second valve element mounted to said second valve cover housing, with said second valve element biased toward its said first position;

each of said first valve element biasing mechanisms and said second valve biasing mechanisms further comprising:

a base;

a swing arm having a first end and a second end, said first end hingedly attached to said base and said second end attached to said respective valve element, a spring, having a first point of attachment and a second point of attachment, said spring, by deflection between said first point of attachment and said second point of attachment, causing a predetermined bias force to be applied in opposition between said swing arm and said base, said predetermined bias force hingedly biasing said seal surface of said respective valve element in a first bias direction toward sealing engagement with an annular seat seal surface of a valve seat, and a pretensioning member having a first end, a second end, a first attachment of said first end of said pretensioning member to said base, and a second attachment of said second end of said pretensioning member to said swing arm, said pretensioning member being adjustable relative to at least one of the first attachment and second attachment define a controllable length between said first attachment and said second attachment, adjustment of said controllable length selected to bias said valve seal surface in a second bias direction with said predetermined bias force;

said first valve housing cover, said first valve element biasing mechanism and said first valve element being removable from said valve housing and replaceable as a first unit, and said second valve housing cover, said second valve element biasing mechanism and said second valve element being removable from said valve housing and replaceable as a second unit.

22. The valve element biasing mechanism of claim 8, wherein at least one end of said pretensioning member is movable with respect to one of said first and second linkage arms.

23. The valve element biasing mechanism of claim 8, wherein at least one end of said pretensioning member is slidable with respect to one of said first and second linkage arms.

24. The check valve of claim 18, wherein at least one end of said pretensioning member is movable with respect to one of said first and second linkage arms.

25. The check valve of claim 18, wherein at least one end of said pretensioning member is slidable with respect to one of said first and second linkage arms.

26. The valve element of claim 1, said support stud having a second end projecting from said clapper body and comprising engagement surfaces for attachment to a support member.

* * * * *